US010110932B2

(12) United States Patent
Bhagwat et al.

(10) Patent No.: US 10,110,932 B2
(45) Date of Patent: Oct. 23, 2018

(54) SESSION ADMINISTRATION

(71) Applicant: Cable Television Laboratories, Inc., Louisville, CO (US)

(72) Inventors: Amol Bhagwat, Louisville, CO (US); Clarke Stevens, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/532,056

(22) Filed: Nov. 4, 2014

(65) Prior Publication Data

US 2015/0143419 A1    May 21, 2015

Related U.S. Application Data

(60) Provisional application No. 61/905,450, filed on Nov. 18, 2013.

(51) Int. Cl.
| | |
|---|---|
| *G06F 3/00* | (2006.01) |
| *G06F 13/00* | (2006.01) |
| *H04N 5/445* | (2011.01) |
| *H04N 7/173* | (2011.01) |
| *H04N 7/16* | (2011.01) |
| *H04N 21/226* | (2011.01) |
| *H04N 21/41* | (2011.01) |
| *H04N 21/436* | (2011.01) |
| *H04N 21/442* | (2011.01) |
| *H04N 21/6377* | (2011.01) |

(52) U.S. Cl.
CPC ..... *H04N 21/2265* (2013.01); *H04N 21/4122* (2013.01); *H04N 21/4126* (2013.01); *H04N 21/43615* (2013.01); *H04N 21/44231* (2013.01); *H04N 21/6377* (2013.01)

(58) Field of Classification Search
CPC ............. H04N 21/4722; H04N 21/482; H04N 21/8586
USPC .......................................................... 725/37
See application file for complete search history.

(56) References Cited

U.S. PATENT DOCUMENTS

| | | | |
|---|---|---|---|
| 7,698,467 B2 | 4/2010 | Kim | |
| 2003/0229900 A1* | 12/2003 | Reisman | ........... G06F 17/30873 725/87 |
| 2008/0141313 A1* | 6/2008 | Kato | .................... H04N 7/1675 725/62 |
| 2010/0293598 A1* | 11/2010 | Collart et al. | ..................... 726/3 |
| 2012/0144416 A1* | 6/2012 | Wetzer | ............. H04N 21/25816 725/14 |
| 2012/0210343 A1* | 8/2012 | McCoy | ............ H04N 21/25875 725/25 |

(Continued)

OTHER PUBLICATIONS

Mapping from MPEG-2 Transport to HTML5, CL-SP-HTML5-MAP-I03-140207.

*Primary Examiner* — Nasser M Goodarzi
*Assistant Examiner* — Jaycee Imperial
(74) *Attorney, Agent, or Firm* — Great Lakes Intellectual Property, PLLC

(57) ABSTRACT

Administration of sessions, such as but not necessarily user interface (UI) and media sessions, is contemplated. The session administration may include transferring and/or sharing a session from one client to another without requiring an application required to process the transferred/shared session to be operational when receiving an action used to initialize session administration.

12 Claims, 4 Drawing Sheets

(56) References Cited

U.S. PATENT DOCUMENTS

2014/0026068 A1* 1/2014 Park .................... G06F 3/0482
　　　　　　　　　　　　　　　　　　　　　　715/748
2014/0310599 A1* 10/2014 Clift .................. H04N 21/4126
　　　　　　　　　　　　　　　　　　　　　　715/719

* cited by examiner

SESSION ADMINISTRATION

CROSS-REFERENCE TO RELATED APPLICATIONS

This application claims the benefit of U.S. provisional Application No. 61/905,450 filed Nov. 18, 2013, the disclosure of which is incorporated in its entirety by reference herein.

TECHNICAL FIELD

The present invention relates to administering sessions, such as but not necessarily limited to a user interface (UI) session used to transport data for a UI application associated with selecting media to be transmitted in a media session.

BACKGROUND

The present invention characterizes a session as any communication between two devices set up at a particular point in time to facilitate a desired operation, such as but not necessary limited to communications established between two devices for a period of time sufficient to facilitate media/content/television streaming, file downloads, voice over Internet protocol (VoIP) communications, cellular phone calls, etc. Various protocols, specification and standards exist to facilitate session-based communications, such as but not necessary limited to those associated with Hypertext Transfer Protocol (HTTP) sessions (application layer), Session Initiation Protocol (SIP) sessions (session layer) and Transmission Control Protocol (TCP) sessions (circuits, connections, sockets-transport layer), the disclosures of which are hereby incorporated by reference in their entireties herein. While not necessarily intending to limit the scope and contemplation of the present invention, the presentation herein is predominately described with respect to the administration of sessions used to facilitate a user interface (UI), referred to as UI sessions, and to facilitate media transport, referred to as media sessions using HTTP protocol.

Media and UI sessions are contemplated for use in any number of environments to enable navigation, second screen information, guides and any number of other applications associated with facilitating media transport, access, download, streaming, etc. One exemplary, non-limiting aspect of the present invention contemplates the use of media and UI session to facilitate access to television related media, such as in the manner described in the specification entitled Mapping from MPEG-2 Transport to HTML5, CL-SP-HTML5-MAP-103-140207, as published by Cable Television Laboratories, Inc. (CableLabs specification), the disclosure of which is hereby incorporated by reference in its entirety. While the present invention is not necessarily limited to MPEG-2 or HTML5 and fully contemplates its use with other transport related protocols, such as MPEG-4, HTML5, MPEG-DASH, ISOBMFF, the media and UI session described in the CableLabs specification with respect to MPEG-2 and HTML5 are illustrative of the sessions contemplated for administration herein.

The CableLabs specification notes HTML5 user agents (UAs), per HTML5, may playback MPEG-2 TS media resources that contain a multiplex of video, audio, text, and private data elementary streams. Television program providers and distributors may use these streams to deliver services associated with the primary video and audio in the multiplexed stream. These services may be collectively termed "TV Services". A common HTML representation of these TV services tracks may be used in order for these TV Services to be made available to Web content in a consistent way. The CableLabs specification defines requirements for how such MPEG-2 TS elementary streams should be translated by the HTML5 UA into the equivalent HTML5 video, audio, and text track elements.

FIG. 1 illustrates a media session 10 and a UI session 12 with respect to a relationship of the translation function in the context of MPEG-2 TS media resources delivered to a Web page by a UA in a client application. The Web page providing the user interface (e.g., program guide) may not always be provided by the originator of the program content. For example, the guide may be provided by the television manufacturer or the cable or satellite TV provider, while the multiplexed streams are provided by hundreds of independent television program providers. Therefore, the Web page may not have a prior knowledge of which streams are in the programs at any given time.

The CableLabs specification uses the following terms:
Descriptor: Structure, used to extend the definitions of programs and streams, consisting of an 8-bit tag followed by an 8-bit descriptor length and data fields.
Elementary Stream: A generic term for a coded video, audio, or other data stream carried in a sequence of PES packets with the same stream id.
Media Resource Timeline: Maps times (in seconds) to positions in the media resource. The origin of a timeline is its earliest defined position. The duration of a timeline is its last defined position. Identical to the media timeline defined in HTML5.
Packet Identifier: A number that uniquely identifies an elementary stream in a program.
Packetized Elementary Stream: An elementary stream encoded in sequence of PES packets where each packet consists of a header followed by a number of contiguous bytes from the elementary stream.
Program Map Table: Specifies the PID stream type, PID, and optional stream descriptors that identify the elementary streams that form each program.
Program Stream: A generic term for an elementary stream that is part of a program.
User Agent: The function that conforms to the HTML specification The CableLabs specification uses the following abbreviations:
DASH: Dynamic adaptive streaming over HTTP.
HTML: Hypertext markup language.
MPEG-2 TS: MPEG-2 transport stream.
PES: Packetized elementary stream.
PID: Packer identifier.
PMT: Program map table.
UA: user agent.

The CableLabs specification defines the requirements for an HTML5 user agent (UA) to recognize and make available to Web content all elementary streams in an MPEG-2 TS media resource so that the following set of TV Services can be provided:
Closed Captioning: Textual representation of the media resource audio dialogue intended for the hearing impaired.
Subtitles: Alternate language textual representation of the media resource audio dialogue.
Content Advisories: Content rating information used by parental control applications.

Synchronized Content: Signaling messages to control the execution of a client application in a manner synchronized with the media resource playback.

Client ad insertion: Signaling messages that convey advertisement insertion opportunities to a client application.

Audio translations: Alternate language representation of the primary audio track.

Audio descriptions: Audio descriptions of the video intended for the visually impaired.

The CableLabs specification applies to single program MPEG-2 transport streams, and while multi-program MPEG-2 transport streams may be out of scope for the CableLabs specification, the use thereof are fully contemplated by the present invention.

The sub-sections noted below according to section references included in the CableLabs specification define requirements for how the UA is required to recognize MPEG-2 TS video, audio, and other data tracks, and how the HTML5 elements representing those tracks are to be created. HTML5 VideoTrack, AudioTrack and TextTrack elements have additional attributes, beyond those referenced in this specification that may be set by the UA, consistent with user preferences. If a user seeks backward (in time) in a media resource and resumes playback, the UA replays tracks it has previously played. In this case, the UA may not create duplicate TextTrackCues for TextTracks in the media resource as TextTrackCues may not be deleted from TextTracks and may still exist in the TextTrack that is being replayed. Creation of new TextTrackCues when the TextTrack is replayed may result in duplicate TextTrackCues. How the UA accomplishes this may be implementation-specific.

5.1 Video, Audio and Text Track Creation

HTML5 VideoTracks, AudioTracks, and TextTracks MUST be created by the UA as defined in HTML5.

5.1.1 Program Description TextTrack

Different types of video, audio, and text elementary streams will be present in a MPEG-2 TS media resource, depending on geographical region, or service or content provider. In order that UA implementations are independent of region and provider, UAs MUST make program map table (PMT) metadata in the MPEG-2 TS [H.222.0] media resource available so that a Web page script can be used to interpret elementary stream types not recognized by the UA.

The UA MUST create a TextTrack in the media resource TextTrack List and set the TextTrack attributes using the following rules:

1) kind="metadata"
2) id="video/mp2t track-description", i.e., the string concatenation of the MPEG-2 TS MIME type [RFC 3555] and "track-description"
3) language=" " (empty string)
4) mode=TextTrack DISABLED For each PMT received in the program stream by the UA, the UA MUST create a DataCue only in the case where the PMT differs from the PMT represented by the previously created DataCue. This is in recognition of the fact that the PMT is received at a minimum rate of every 140 msec but rarely changes.

For each new PMT, a UA MUST create a new DataCue in the text track as described in [HTML5] section "Text track model" with attributes set as follows:

1) startTime is set to the current time in the media resource timeline
2) endTime=startTime
3) data is set to the PMT data in its unparsed binary form
4) text is set to null
5) pauseOnExit=false 5.1.2 VideoTrack For all MPEG-2 video stream types that the UA can render, the UA MUST create a new VideoTrack in the VideoTrackList of the media resource.

The UA MUST create VideoTracks in the VideoTrackList in the same order as they appear in the PMT. This is to comply with VideoTrackList creation requirements in [HTML5].

The UA MUST set the VideoTrack id attribute to the string representation of the PID in the PMT, interpreted as a decimal number, of the elementary stream represented by this track.

The UA MUST set VideoTrackList[0].VideoTrack.kind="main".

If the UA cannot determine the values for the VideoTrack kind and language attributes [HTML5], it MUST set them to the empty string.

5.1.3 AudioTrack

For all MPEG-2 audio stream types that the UA can render, the UA MUST create a new AudioTrack in the AudioTrackList of the media resource.

The UA MUST create AudioTracks in the AudioTrackList in the same order as they appear in the PMT. This is to comply with AudioTrackList creation requirements in [HTML5].

For each AudioTrack created, the UA MUST set the id attribute to the string representation of the PID in the PMT, interpreted as a decimal number, of the elementary stream represented by this track.

The UA MUST set AudioTrackList[0].AudioTrack.kind="main".

If the AudioTrack contains an associated service for the visually impaired [ATSC_53] the UA SHOULD set AudioTrack.kind="main-desc" and AudioTrack.language to the BCP47 formatted[BCP 47] value of the ISO_639 language descriptor[H.222.0].

For AudioTracks that are not at AudioTrackList[0] and are a main audio service [ATSC_53], the UA SHOULD set AudioTrack.kind="translation" and AudioTrack.language to the BCP47 formatted [BCP 47] value of the ISO_639 language descriptor[H.222.0].

If the UA cannot determine values for the AudioTrack kind and language attributes [HTML5], it MUST set them to the empty string.

5.1.4 Other TextTracks

For stream types 0x05 and 0x80-0xFF [H.222.0], the UA MUST create a new TextTrack in the TextTrackList of the media resource.

The UA MUST create TextTracks in the TextTrackList in the same order as they appear in the PMT. This is to comply with TextTrackList creation requirements in [HTML5].

The UA MUST set the TextTrack kind and language attributes for the elementary stream as defined in Table 1.

TABLE 1

Text Track Kind

| Stream Description | Kind | language |
|---|---|---|
| Content advisory descriptor [SCTE_54] | metadata | ... |
| Region rating table [CEA_766] | metadata | ... |
| Enhanced TV messaging [EISS] | metadata | ... |
| Program insertion Cue messages [SCTE_35] | metadata | ... |
| Subtitles [SCTE_27] rendered by the UA | subtitle | BCP47 [BCP 47] formatted contents of the ISO 639 Language Descriptor [H.222.0] |
| Subtitles [SCTE_27] not rendered by the UA | metadata | ... |
| Any other private user elementary streams (stream_type == 0 × 05, 0 × 80 – 0 × FF) containing private sections (payload_unit_start_indictor == 1) [H.222.0] | metadata | ... |

The UA MUST set the TextTrack id and mode attributes as follows:
1. id=the string representation of the PID in the PMT interpreted as a decimal number of the elementary stream represented by this track.
2. mode=TextTrack DISABLED The MPEG-2 TS packets with the PID corresponding to the TextTrack contain private data packets as defined in [H.222.0]. The UA MUST create a cue containing one or more complete private data packets in the elementary stream. A cue must be created within at most 100 milliseconds of the detection of the first private data packet in the elementary stream.

For each private data packet in the elementary stream represented by the TextTrack, the UA MUST create a cue in the TextTrack as described in [HTML5] section "Text track model." The type of cue depends on the value of the kind attribute. For kind ==metadata the UA MUST create a DataCue. The UA MUST set the following attributes for all DataCues:
1. startTime is set to the current time in the media resource timeline.
2. endTime is set to startTime.
3. pauseOnExit is set to false.
4. data is set to the contents of the unparsed private data packet.
5. text is set to null.

It is important to note that the semantics of metadata TextTrack and TextTrackCue are opaque to the UA. So, for example, if the UA does not recognize a subtitle track but creates a generic metadata text track as defined above, the UA behavior defined in [HTML5] for subtitle tracks will not occur since the UA is not aware this is a subtitle track.

It is up to a Web page script to identify the subtitle track and process the subtitle messages in the TextTrackCues in a manner appropriate for the subtitle format.

5.2 Closed Captioning

Video elementary streams contain closed captioning data as indicated by a caption_service_descriptor [ATSC_53], [SCTE_54], or closed-caption type (cc_type) in the User Data [CEA_708]. For all MPEG-2 video stream types that the UA can render, closed captioning, if present, MUST be made available by the UA as follows:
1. Create a new TextTrack as defined in [HTML5] section "Sourcing in-band text tracks" with the track element attributes set as follows:
   a. kind="caption"
   b. language is set to a [BCP 47]-conformant representation of the caption data language
   c. id is set to a text string of the decimal representation of the PID of the MPEG-2 video program stream containing the caption data
   d. mode=TextTrack DISABLED 5.3 Subtitles

[SCTE_27] subtitles may be made available by the UA as follows:
1. Create a new TextTrack as defined in [HTML5] section "Sourcing in-band text tracks" with the track element attributes set as follows:
   a. kind="subtitle"
   b. language is set to a [BCP 47]-conformant representation of the caption data language
   c. id is set to a text string of the decimal representation of the PID of the MPEG-2 video program stream containing the caption data
   d. mode=TextTrack DISABLED References, the disclosures of which are hereby incorporated by reference in their entireties herein:

[ATSC_53] AC-3 Audio System Characteristics, ATSC Standard A/53, Part 5:2010.
[ATSC_65] Program and System Information for Terrestrial Broadcast and Cable (PSIP), ATSC Standard A/65.
[BCP 47] IETF BCP 47, Tags for Identifying Languages, http://tools.ietf.org/html/bcp47.
[CEA_708] Digital Television (DTV) Closed Captioning, Doc. CEA-708-D.
[CEA_766] U.S. and Canadian Rating Region Tables (RRT) and Content Advisory Descriptors for Transport of Content Advisory Information Using ATSC Program and System Information Protocol (PSIP), Doc. ANSI/CEA-766-C.
[EISS] OpenCable™ Enhanced TV Application Messaging Protocol 1.0, OC-SP-ETV-AM1.0.1-120614, Jun. 14, 2012, Cable Television Labs, Inc.
[H.222.0] ISO/IEC 13818-1|ITU-T H.222.0 May 2006, Infrastructure of audiovisual services—Transmission multiplexing and synchronization, http://www.itu.int/rec/T-REC-h.222.0/en.
[HTML5] HTML5—A vocabulary and associated APIs for HTML and XHTML, http://www.w3.org/TR/html5/.
[RFC 3555] IETF RFC 3555, MIME Type Registration of RTP Payload Formats, http://tools.ietf.org/html/rfc3555.
[SCTE_27] ANSI/SCTE 27 2011, Subtitling Methods for Broadcast Cable.
[SCTE_35] ANSI/SCTE 35 2012, Digital Program Insertion Cueing Message for Cable.

[SCTE_54] ANSI/SCTE 54 2006, Digital Video Service Multiplex and Transport System Standard for Cable.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
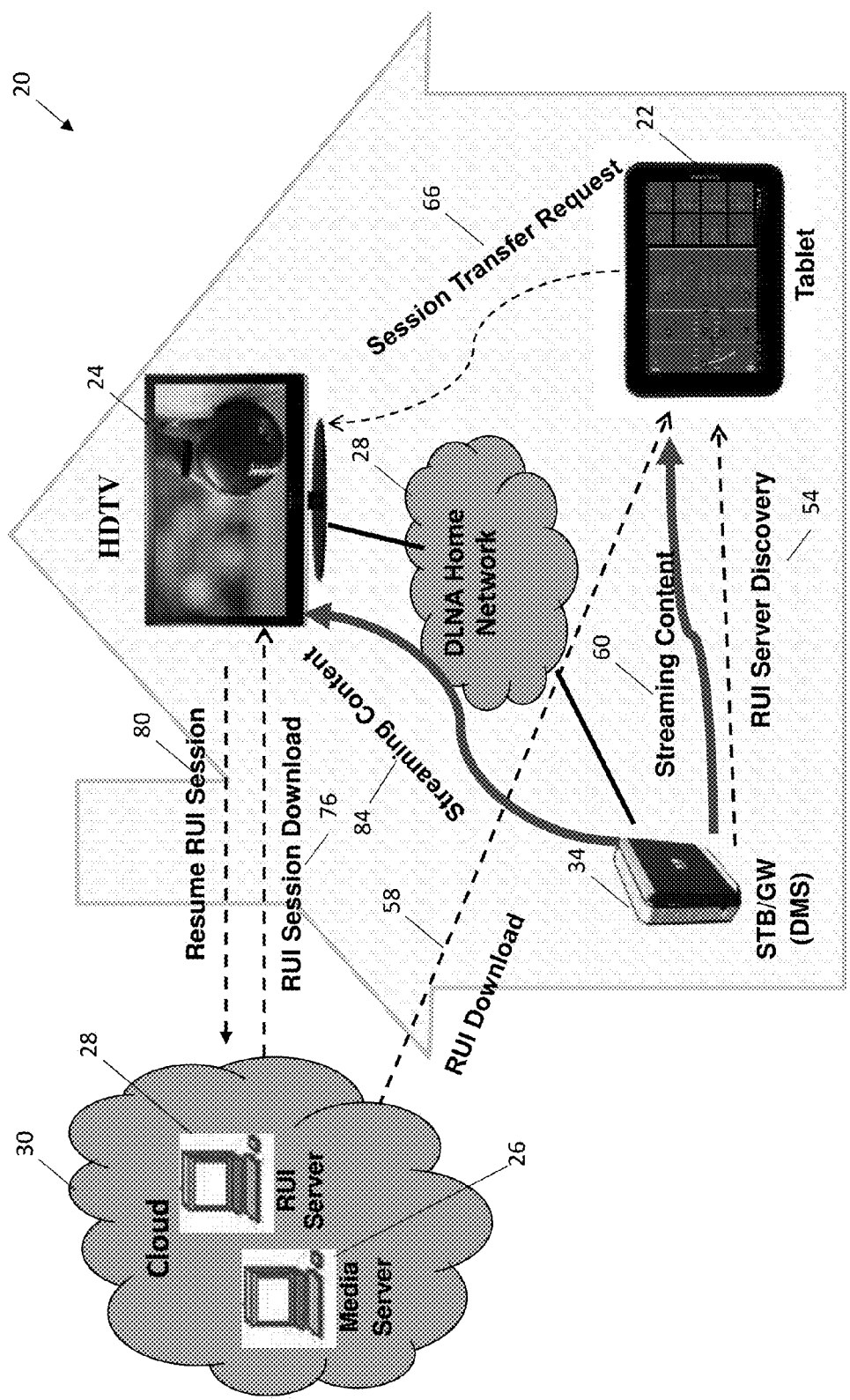
FIG. 2 illustrates a system for administrating sessions in accordance with one non-limiting aspect of the present invention.

FIG. 2 illustrates a system 20 for administrating sessions in accordance with one non-limiting aspect of the present invention. The system 20 describes an exemplary implementation where a user may be enabled to transfer and/or share one or more sessions between a first client 22 and a second client 24. The contemplated transferring and/or sharing of sessions may include transferring and/or sharing the above-described media and UI sessions and/or any other type of session suitable to facilitating media, data, voice, or other electronically transmissible data. The first and second clients 22, 24 may correspond with any device having capabilities sufficient to facilitate establishing sessions, which are shown for exemplary non-limiting purposes to respectively correspond with a tablet and a television as the clients 22, 24 may correspond with any other type of device, including a set-top box (STB), a mobile or cellular phone, a media terminal adapter (MTA), a computer, etc. The sessions being administered may be suitable to facilitate access to virtually any type of content and are predominately described for exemplary non-limiting purposes to facilitate access to television related media, such as television programs, movies, music, etc. carried within media session originating from a media server 26.

The media server 26 may be associated with a content provider, a cable television service provider, a multiple system operator (MSO), Multichannel Video Programming Distributor (MVPD), an Internet service provider (ISP), a cellular or mobile phone provider or other content source, such as but not necessary limited to a Web-based over-the-top (OTT) content provider. A remote user interface (RUI) server 28 may be included to provide a user interface (UI), guide or other data/signaling sufficient to facilitate an application operating on one of the clients 22, 24. The application operating on the clients 22, 24 may be configured to provide navigation, selection, second screen operations, etc. for the content available from the media server 26 or otherwise accessible to a corresponding user, e.g., a particular type of service provider may provide enhanced operations for second screen features using information communicated from the RUI server. Optionally, the system 20 may be configured to facilitate service personalization, such as in the manner described in U.S. patent application Ser. No. 13/973,572, entitled Media Engagement Factors, the disclosure of which is hereby incorporated by reference in its entirety herein.

The services personalization may include room-level personalization for secondary applications configured to supplemental occupant experiences relative to content interfaced through the television 24 or otherwise being delivered by the service provider. The secondary applications may be configured and/or operable in the manner described in U.S. patent application Ser. No. 12/827,147, entitled Synchronization of $2^{nd}$ Screen Applications, Ser. No. 13/755,254, entitled Content Synchronization, and Ser. No. 13/922,386, entitled Administration of Web Page, the disclosures of which are hereby incorporated by reference in their entireties herein. Such secondary screen personalization may cooperate with the personalization provided through a primary screen (e.g., television) and/or operated independently thereof, such as to personalize services to a different room occupant. The secondary screen personalization may be achieved with secondary personalization messages described in U.S. patent application Ser. No. 13/534,238, entitled Back Channel Communications, the disclosure of which is hereby incorporated by reference in its entirety. The first and second clients 22, 24 may operate as primary and/or secondary screen devices depending on their current operating state, e.g., the first client 22 may be a second screen application for the second client 24 and at other times the first client 22 may provide dual functionality by operating as both of a primary and a second screen application.

The first and second clients 22, 24, and optionally additional clients (not shown) operable in accordance with the present invention, may be configured to share content and/or otherwise communicate with each other over a home network 28 according to guidelines of the Digital Living Network Alliance (DLNA), including Part 1-1: Architectures and Protocols, Part 1-2: Extended Digital Media Renderer, Part 1-3: Cloud Access, Part 2: Media Format Profiles, Part 3: Link Protection, Part 4: DRM Interoperability Solutions (DIS), Part 5: Device Profiles, Part 6: Remote User Interface—HTML5, Part 7: Authentication, Part 8: Diagnostics, Part 9: HTTP Adaptive Delivery and/or Part 10: Low Power Mode, published by DNLA March 2014, the disclosures of which are hereby incorporated by reference in their entireties herein. The first and second clients may also be configured to facilitate service discovery according to Universal Plug and Play (UPnP), such as that described within UPnP Device Architecture 1.0, published October 2008 by the UPnP Forum, and Simple Service Discovery Protocol (SSDP), such as that described in Simple Service Discovery Protocol/1.0, published October 1999 by The Internet Engineering Task Force (IETF), the disclosures of which are hereby Incorporated by reference in their entireties.

The system 20 illustrates an exemplary environment where a wide area network (WAN) 30 interacts with the home network 28 or a local area network (LAN) via a gateway 34. The WAN 30 may be associated with one of the above-described service providers or other service provider having capabilities sufficient to provide Internet or other communications with the LAN 28. The LAN 28 may be an inside network or other private network outside or independent of the WAN 30 and be associated with a subscriber or customer of the service provider, such as but not necessary limited to a network small office and home office (SoHo). The gateway 34 may be a customer edge router (CER) configured to comply with RFC 6204, RFC 6204BIS, and IPv4 and IPv6 eRouter Specification (CM-SP-eRouter-I08-120329), the disclosures of which are hereby incorporated by reference in their entirety. The gateway 34 may optionally be configured to source media and/or UI sessions or other content, such as that available from the media server 26 and/or the RUI server 30, e.g., the gateway 34 may act as a video on demand (VOD) device or a digital video recorder (DVR). One non-limiting aspect of the present invention contemplates media session and/or UI sessions being delivered to the gateway 34 over the Internet or other IP-based network packet-switch network and thereafter distributed over the home network 28.

Figure 1:
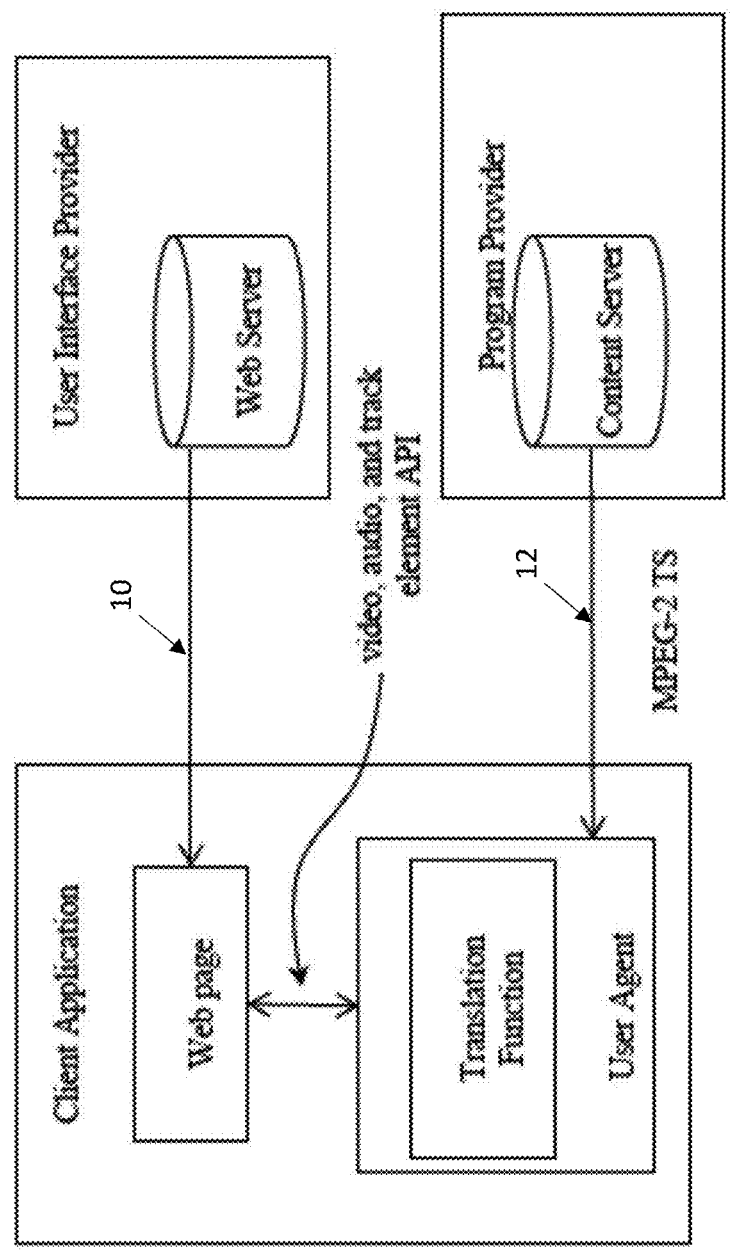
FIG. 1 illustrates a media session and a UI session as contemplated by one non-limiting aspect of the present invention.

The system 20 may be utilized to enable customers to consume premium entertainment content on any device/client of their choice, at any time and at any place (inside or outside of the home). The media server 26 may leverage the IP-based home network to facilitate delivering QAM-sourced content from the in-home video gateway 34 to devices of customers' choice in any room within the home, which may serve as a transition strategy for providing content to IP-based devices in the home before migrating to End-To-End IP video architecture. Such a solution may be utilized to enable operators to fulfill regulatory obligation of enabling a standards-based IP output from their high-definition set-tops (HD-STBs) to serve retail Consumer Electronics (CE) devices as a part of Federal Communications requirements and/or to facilitate the operations described above with respect to FIG. 1. Using the gateway 34, STB or other sufficiently configured client, operators may be able to fulfill their contractual agreements with content providers in terms of support for features such as content security, ad insertion, and enhanced TV (ETV) applications including Video on Demand (VOD) and television commerce (T-commerce) transactions. The gateway/STB, in conjunction with a cable operator guide, may support cable operators' regulatory compliance requirements such as providing closed captions, parental controls, Emergency Alert System (EAS) messages, Secondary Audio Programming (SAP), and Descriptive Video Services (DVS).

In order to support a full set of cable services such as live/linear content, Video On Demand (VoD), Digital Video Recorder (DVR), and Pay-Per-View (PPV), the clients 22, 24, gateway 34 and/or other devices associated with the home network 28 may be configured to support an appropriate set of audio and video codecs with specific resolution, bit rate, and frame rate, e.g., QAM-sourced cable content predominantly uses MPEG-2 video encapsulated in MPEG-2 TS, and H.264/AVC in MPEG-2 TS and adaptive bit rate streaming may be used to stream video over Wi-Fi networks to portable devices. The clients 22, 24 may be configured to support an HTML5-based Remote User Interface. DLNA HTML5 Remote RUI specification defines a profile of W3C's HTML5 specification and other related specifications such as Cascading Style Sheets (CSS), Web Sockets, XMLHTTPRequest (Ajax), and FullScreen. HTML5 enables providers to develop their guide once and offer it on a wide range of platforms resulting in reduced development costs and faster time to market for new services/applications. It also enables providers to offer their guides directly from the cloud, thereby enabling them to rapidly evolve their services and applications to consumers.

The gateway 34 may be configured to advertise a Uniform Resource Locator (URL) of the operator HTML5 guide for the clients 22, 24 to discover the URL using the UPnP RUI Discovery mechanism. The guide can be served either from the in-home video gateway 34 or from the cloud 30 using the RUI server 28. Using the <video> tag defined in the HTML5 specification, operators may display video within their guide user interface pages. DLNA HTML5 RUI Specification defines DLNA specific extensions to support playback Digital Transmission Copy Protection (DTCP) over IP link protected video content using <video> tag. In addition, the DLNA HTML5 RUI specification defines extensions to HTML5<video> tag to support time-based seek and play-speed trick modes so that a consumer is able to pause, rewind and forward the video from the HTML5 guide page. The CableLabs specification described above defines a standardized mechanism for exposing information about cable operator regulatory and contractual services, such as closed captions, content advisories, SAP, DVS, and ad insertion carried in the MPEG-2 TS video stream as HTML5 audio, video and text tracks, so that cable operator HTML5 applications can provide these services to consumers. DLNA HTML5 RUI may rely on implementation of this specification so that operators can fulfill their regulatory and contractual obligations while offering cable services to CVP-2 devices. DLNA HTML5 RUI Specification may also provide support for W3C's Server Sent Events (SSE) specification. Using SSE, operators are able to provide EAS messages to cable operator HTML5 RUI applications running on CVP-2 devices.

Figure 3:
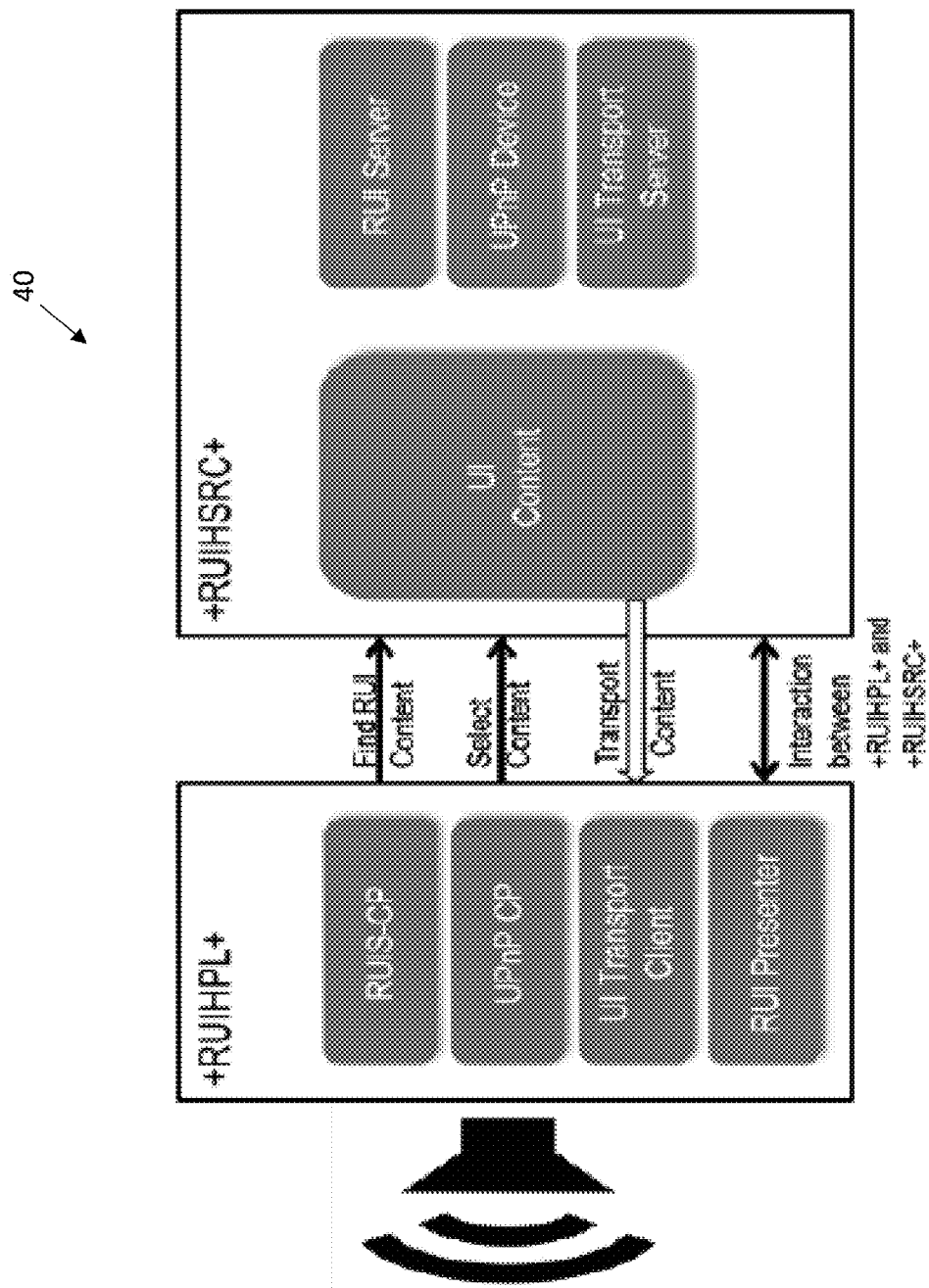
FIG. 3 illustrates HTML5 RUI entities and functions in accordance with one non-limiting aspect of the present invention.

FIG. 3 illustrates a schematic 40 for HTML5 RUI entities and their functions in accordance with one non-limiting aspect of the present invention. HTML5 RUI (RUI-H) Source capability (+RUIHSRC+) has the role of exposing and sourcing RUI-H content and includes RUI-H Server (RUINS), RUI-H Transport Server, and an optional DLNA Media Transport Server (for serving media content):

RUINS provides UPnP RUI Server device functionality, which enables CVP-2 Servers to offer one or more remote UIs based on HTML5, and to handle UPnP RUI Server service actions.

RUI-H Transport Server and RUI-H Transport Client are the device functions for transport of the RUI-H content between a client and server.

RUI-H Pull Controller (+RUIHPL+) has the role of finding and loading RUI-H content that is exposed by a +RUIHSRC+ capability, rendering the UI content, and interacting with it. RUI-H Pull Controller includes RUI-H Server Control Point (RUIHS-CP), RUI-H Transport Client, RUI-H User Agent and an optional DLNA Media Transport Client.

RUIHS-CP is a controller for browsing and selecting an HTML5 remote UI offered by a RUI-H Server.

RUI-H User Agent functionality on a RUI-H Client is responsible for retrieving, decoding, presenting and interacting with the RUI-H content received from the RUI-H Server.

Figure 4:
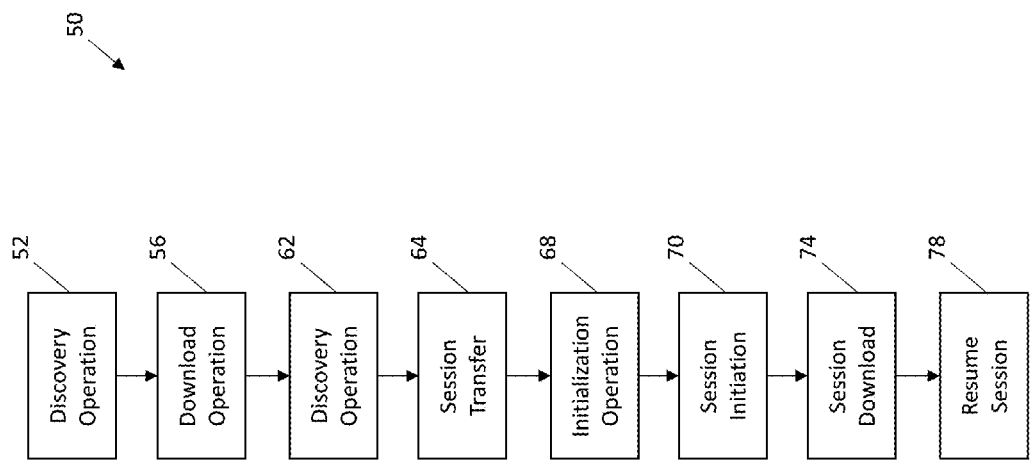
FIG. 4 illustrates a flowchart for a method of administering sessions in accordance with one non-limiting aspect of the present invention.

FIG. 4 illustrates a flowchart 50 for a method of administering sessions in accordance with one non-limiting aspect of the present invention. The method may be embodied in a computer-readable medium having a plurality of non-transitory instructions operable with a processor, e.g., one or both of the clients 22, 24 or other devices, sufficient to facilitate the operations and other functions contemplated herein. The method is predominately described with respect to facilitating administration of sessions used to support television programming for exemplary non-limiting purposes as the present invention fully contemplates its use and application in facilitating access to any type of media/ content. The method is also predominantly described with respect to the media server 26 providing a media session to deliver media to the home network 28 and the RUI server 28 providing a UI session to facilitate delivering UI information to the home network 28 for exemplary non-limiting purposes as the present invention fully contemplates the sessions being sourced from other entities outside of the home network 28 and/or from entities within the home network 28. The separately transmitted media and UI sessions are described for exemplary non-limiting purposes in order to facilitate explanation of their administration as the sessions may be combined/integrated or otherwise transmitted.

The method described herein pertains to one of many use cases where a user engages a UI application operating on the first client 22 to navigate for content also available through the UI application for viewing, i.e., the first client 22 constructions and actively engages with at least a media session and a UI session. The corresponding sessions may be communicated over the outside network 30 to the gateway 34 and over the home network 34 to the first client 22. Thereafter, the method contemplates the user desiring to transfer/share one or more of the sessions active at the first client 22 with the second client 24, such as to facilitate sharing the media session so as to enable the second client 24 to display a television program while the first client 22 operates as a second screen application providing secondary information or second screen control during playback of the television program. In order to transfer/share an UI session and/or as well as an associated media session between two clients, the following session parameters may be generated and shared between the two clients 22, 24:

UI Server URL: URL (IP address, domain name, etc.) to a UI Server/Web Server that would provide a UI or a web service. (UI is just a special case of a web service, e.g. UI could be an MSO guide served from the cloud using which MSOs provide video services)

SessionToken: A randomly generated SessionToken (generated by the UI server) that uniquely identifies the session with a UI server. This token also acts as a security/authorization token that is used to prevent malicious requests for session transfer/sharing. Using the SessionToken, the HTML5 UI server is able to identify the following parameters:

Media Session URL: Includes media server address (IP address, domain name, etc.) and media session id Current Media Position: Current position (in terms of time or byte offset from the beginning) in the media stream that is being viewed by the user. This could be omitted if the media session id encapsulates this information One non-limiting aspect of the present invention proposes a new action to the UPnP RUI Client Service, e.g. ShareSession( ) as a primary/optimum mechanism for communicating the following information from one client to another:

RUI Type: This parameter communicates what type of a Remote User Interface protocol session needs to be established by the client (e.g. HTML5, CEA-2014, RVU, etc.) This may corresponds to application::alternativeID element defined to be "HTML5_RUI_Browser" for HTML5 RUI scenario.

UI/Web Server URL: This may be used to launch appropriate application on the 2nd device to access the service located at that URL. (e.g. Netflix app). For HTML5 RUI scenario, a specific value is defined for this URI, "generic-cloudservice.dlna.org", such that based on this URI, the 2nd device launches the HTML5 RUI browser.

SessionToken: Such as the <dlna:ServiceInitialization> element, which for a HTML5 RUI scenario may include actual URI of an HTML5 RUI server (that provides HTML RUI) and the RUI session ID for which session transfer is requested.

Block 52 relates to a RUI server discovery operation, such as that shown with reference numeral 54 in FIG. 2 wherein the first client 22 interacts with the gateway 34 to identify the RUI server 28, e.g., the gateway 34 may provide the UI/web server URL to the first client 22. Block 56 relates to a RUI download operation, such as that shown with reference numeral 58 in FIG. 2 wherein the first client 22 utilizes the UI URL to create a UI session with the RUI server 28. The UI session may be utilized with a browser or other application operating on the first client 22 to facilitate navigating, browsing or otherwise facilitate selection and other interactions with services associated with the media server 26 or otherwise available from an operator associated with the home network 34. As shown with reference numeral 60 in FIG. 2, a media session may be established with the media server as a function of user interaction with the UI operating on the first client 22 as part of the UI session. The first client 22 may begin playing content and displaying secondary information upon construction of the media and UI sessions, such as to facilitate the operations described above. The corresponding UI may include a button or other selectable feature to facilitating transferring and/or sharing the media and/or UI session with the second client 24.

Block 62 relates to performing a discovery operation where the first client 22 may discover the second client 24 and/or other clients associated with the home network 28 having capabilities sufficient support the contemplated session administration. The discovery operation may be performed according to UPnP and/or DLNA to identify the second client(s) 24 having capabilities sufficient to support the media and/or UI sessions, such as those devices indicating support for a DLNA mobile sharing extension. Once the second client 24 is discovered, Block 64 relates to engaging a session transfer request operation, as shown with reference numeral 66 in FIG. 2, to provide the second client 24 with information necessary to facilitate the contemplated session administration. This may include the first client 22 invoking a SetAVTransportURI or SetNextAVTransportURI action on the AVTransport Service on the second device 24. The action may provide the second client with a DLNA-service URI value set to "generic-cloudservice.dlna.org" and UI Server URL and SessionToken information in the <dlna:ServiceInitialization> element.

Block 68 relates to an initialization operation where the second client 24, upon receipt of the action, initializes a RUI protocol implementation identified in the RUI type parameter, i.e. HTML5 RUI Browser in DLNA guidelines, or other application having capabilities sufficient to process the media and/or UI sessions. The initialization operation may remotely instantiate the browser or other application dormant or otherwise not already running on the second client 24 to begin the session administration contemplated herein, such as by issuing a command to instantiate the browser. The ability to remotely instantiate the browser may be beneficial in eliminating a need for a user to instantiate and engage the browser of the second client 24 through manual operation, such as to facilitate a seamless administration of the media and/or UI session at the second client 24. Block 70 relates to a session initiation operation where the remotely instantiated application on the second client device 24 initiates a session using the UI server URL, such as to provide the SessionToken to the UI server 28. The UI server 28 may then process the SessionToken to verify the authenticity of the request, and using the SessionToken, the UI Server 28 may extract the session parameters, e.g., UI Session ID, application state ID, media/content session ID, current media location, etc.

The UI server may create a new UI session ID for a UI session with the second client 24 and associate the application state ID with it. Block 74 relates to a RUI session download operation, which as shown with reference number 76 in FIG. 2 may corresponding with the RUI server 28 connecting the UI sessions for both of the first and second clients 22, 24 with the same application state at the UI server 28. The UI Server 28 can then communicate the new UI session ID, media/content session ID, and current media location to the second client 24 in response to its connection initiation request (along with the SessionToken parameter for security purposes). Block 78 relates to performing a resume RUI session operation, which as shown with reference numeral 80 in FIG. 2 may correspond with the RUI server 28, using the media/content session ID and current media location parameters, facilitating a media session between the second client 24 and the media server 26. The RUI server 28 may instruct the media server 24 and/or gateway 34 to create a media session for the second client 24 matching that being provided to the first client 22 and/or instructing the media server 26 and/or the gateway 34 to transfer the media session from the first client 22 to the second client 24 such that media content begins playback at the second client 24 where it left off at the first client 22, which is shown with reference numeral 84 in FIG. 2.

The establishment of the media and/or UI session with the second client 24 and/or the continued use of the media and/or UI session with the first client 22 may complete the session administration. The user is now enabled to watch the media session on the second client 24 from the same media location as when the session was requested to be transferred from first client 22. The user can choose to keep the first client sessions, both UI and media sessions, active or end one or both the sessions. (User may choose to keep first client's UI session active and disconnect the media session, and use the first client as a remote control for the second client, such as in the manner described in the My Stuff Everyone (MSE) processes described in the applications incorporated above.) In this manner, the present invention proposes manipulating in-process media and UI sessions by determining a session to be in-process with the first client and generating an action sufficient for initializing the second client to establish a corresponding session. The action may be sufficient to instantiate a dormant or inactive application on the second client and include a UI server URL and a SessionToken to enable the second client to utilize the UI server URL to communicate the SessionToken for purposes of authenticating and establishing the second media session at the second client (transferring or sharing of the media session previously engaged at the first client).

One non-limiting aspect of the present invention contemplates utilizing an action to initiate an application needed on the second client to facilitate access to Web-based content transmitted through the media and/or UI sessions. Other mechanisms that can be utilized to share session information between the two devices may include: defining a new UPnP Service for multiscreen sharing and adding the UPnP action to that service and/or defining a new web service that is implemented on the second client. One non-limiting aspect of the present invention provides a mechanism to transfer UI application from one client to another, when the second client doesn't have a corresponding UI application session running so as to switch watching video between small and big screen devices, including enabling switching of an entire user experience from one device to another, rather than just transferring video (in order to continue to meet their contractual and regulatory obligations—see Mapping from MPEG-2 Transport to HTML5 described above). In addition, by maintaining their user experience across devices, operators can offer several companion services such as content synchronized advertisement, social interaction, etc. on handheld devices while continuing to watch video on a big screen, pausing a video on one device and resuming it from another device, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for manipulating in-process sessions comprising:
   determining a first session to be in-process between a media server and a first client;
   determining a second session to be in-process between a remote user interface (RUI) server and the first client;
   determining a UI server universal resource locator (URL) for the RUI server;
   determining a SessionToken for the first session;
   determining a user interface (UI) type for the second session;
   discovering a second client having capabilities sufficient to implement a UI operable with the UI type, the second client being discovered according to messages exchanged over a home network with the first client;
   generating an action sufficient for initializing the UI of the second client to establish a third session with the media server matching the first session, the action including the UI server URL and the SessionToken, the second client utilizing the UI server URL to communicate the SessionToken to the RUI server, the RUI server utilizing the SessionToken received from the second client to facilitate constructing the third session;
   determining the second client as a function of Universal Plug and Play (UPnP) messages exchanged over the home network with a UPnP service operating on the second client while the UI of the second client utilized to establish the third session is dormant and unable to act on the action until instantiated by the UPnP application or another application operating on the second client;
   determining the second client as one of a plurality of clients identified from the UPnP messages as supporting a UPnP mobile sharing extension, the second client using the UPnP service to transmit the UPnP messages over the home network;
   generating the action in accordance with UPnP such that the action is a UPnP action; and
   transmitting the UPnP action from the first client to the UPnP service operating on the second client while the UI of the second client utilized to establish the third session is dormant, the UPnP service then awakening or otherwise activating the dormant UI to thereafter transmit the SessionToken included as part of the action to the RUI server using the UI server URL specified in the action, thereby resulting in the RUI server instructing the media server to construct the third session with the second client.

2. The method of claim 1 further comprising:
determining the first session to include a plurality of video frames forming a television program, the first session being transmitted from the media server to the first client for playback, the second session including secondary information being transmitted from the RUI server to the first client for supplementing playback of the television program without the plurality of video frames being included therewith; and
engaging a session transfer request operation to transmit the UPnP action from the first client to the second client.

3. The method of claim 2 further comprising the RUI server creating a fourth session with the second client as a function of information included within the SessionToken, the fourth session including the secondary information such that the second client facilitates playback of the television program via the third session and display of the secondary information via the fourth session.

4. The method of claim 2 further comprising:
facilitating the third session to include the television program and not the secondary information;
facilitating cessation of the first session after the television program begins to be processed at the second client via the third session;
preventing transmission of the secondary information to the second client while the secondary information is being transmitted to the first client as part of the second session; and
facilitating second screen playback control of the television program when played on the second client via the third session according to control messages communicated from the first client via the second session.

5. The method of claim 2 further comprising:
processing second screen playback control messages communicated from the first client via the second session, wherein a pause message included as at least one of the second screen playback control messages indicates a user of the first client desiring to pause playback of the television program; and
providing second screen control of the third media session at the second client as function of the control messages, including pausing playback of the television program at the second client upon receipt of the pause message.

6. The method of claim 1 further comprising:
determining session parameters for the first session as a function of the SessionToken, the session parameters being sufficient for the RUI server to identify a television program being transmitted from the media server to the first client as at least part of the first session; and
transmitting control instructions from the RUI server to the media server to facilitate subsequently controlling transmission of the television program identified with the session parameters from the media server to the second client via the third session.

7. A non-transitory computer-readable medium having a plurality of non-transitory instructions operable with a processor to facilitate administering sessions, the non-transitory instructions being sufficient for:
determining a user interface (UI) session between a remote user interface (RUI) server and a tablet, the UI session being used to provide secondary information for content being streamed in a media session between the tablet and a media server;
processing a discovery message communicated over a network associated with the tablet to determine a television connected to the network having an media application sufficient for processing the media session, including processing the discovery message while the media application of the television is dormant or inactive and incapable of transmitting the discovery message;
following processing of the discovery message, generating a Universal Plug and Play (UPnP) action sufficient for instructing the media application to transmit a SessionToken received from the tablet to the RUI server, the SessionToken causing the RUI server to subsequently facilitate transfer of the media session from the tablet to the television, the SessionToken including parameters sufficient for the media server to stream the content to the television at a point where the content was last transmitted to the tablet;
determining the television as a function of the discovery message being one of a plurality of UPnP the messages being communicated from the television and other UPnP clients over the network with a UPnP application operating on the television independently of the media application and while the media application was dormant or inactive, the UPnP messaging indicating the television being sufficient to support a UPnP mobile sharing extension, the UPnP application processing the UPnP action while the application is dormant or inactive and thereafter awakening the application to process the UPnP action and subsequently transmit the session token to the RUI server;
determining the discovery message from a UPnP transmission made with a UPnP service operating on the television while the media application was dormant or inactive; and
transmitting the UPnP action from the tablet to the UPnP service operating on the second client while the media application was dormant or inactive, the UPnP service then awakening or otherwise activating the media application to subsequently transmit the SessionToken to a domain name or IP address of the RUI server specified within the UPnP action.

8. The non-transitory computer-readable medium of claim 7 further comprising non-transitory instructions sufficient for:
determining the media and UI sessions to be Internet Protocol (IP) based; and
transmitting the UPnP action to the television while the media application is dormant, including specifying a command in the UPnP action sufficient to render the media application non-dormant and to control the media application to subsequently transmit the SessionToken to a domain name or IP address of the RUI server specified within the UPnP action.

9. The non-transitory computer-readable medium of claim 7 wherein the media application is a Web browser and the non-transitory instructions are sufficient for instructing the UPnP application operating on the television separately from the Web browser to process the UPnP action and thereafter awaken the Web browser, the awakened Web browser then transmitting the SessionToken to the RUI server within a newly established UI session, the RUI server authenticating the SessionToken, and if authenticated, providing instructions to the media server sufficient to transfer the media session to the television.

10. A non-transitory computer-readable medium having a plurality of non-transitory instructions operable with a processor of a tablet, the non-transitory instructions being sufficient for:

- determining a first user interface (UI) session between a remote user interface (RUI) server and the tablet, the first UI session being used to provide information for content being streamed in a media session between the tablet and a media server, the first UI and media sessions being Internet Protocol (IP) sessions carried at least partially over the Internet and a home network of a subscriber, a modem providing an interface between the Internet and the home network;
- generating a Universal Plug and Play (UPnP) action sufficient for instructing a Web browser included on a television connected to the home network to transmit a request to the RUI server for transfer of the media session from the tablet to the television, the request being communicated to the RUI server via a second UI session created after transitioning the Web browser from an inactive state to an active state following receipt of the UPnP action, the UPnP action being addressed to the television as a function of information included in a UPnP message transmitted from the television over the home network while the Web browser was in the inactive state;
- transmitting the UPnP action over the home network using a Universal Plug and Play (UPnP) controller included on the tablet, the UPnP controller transmitting the UPnP action without engaging the Web browser in the television so as to enable the Web browser to remain in the inactive state until receipt of the UPnP action;
- wherein the inactive state is characterized by the Web browser being unable to communicate the request and the active state is characterized by the Web browser being able to communicate the request;
- transmitting the UPnP action from the UPnP controller of the tablet to a UPnP service operating on the television independently of the Web browser, the UPnP service thereafter transitioning the Web browser from the inactive state to the active state;
- determining the television as a function of UPnP messages exchanged over the home network with the UPnP service while the of the television is dormant and unable to act on the UPnP action until instantiated by the UPnP;
- determining the television as one of a plurality of clients identified from the UPnP messages as supporting a UPnP mobile sharing extension, the television using the UPnP service to transmit the UPnP messages over the home network;
- transmitting the UPnP action from the tablet to the UPnP service operating on the television while the Web browser is dormant, the UPnP service then awakening or otherwise activating the dormant Web browser to thereafter transmit the SessionToken included as part of the action to the RUI server using the UI server URL specified in the UPnP action.

11. The non-transitory computer-readable medium of claim 7 further comprising non-transitory instructions sufficient for generating the UPnP action to include:

- an RUI type sufficient to indicate a type of UI for the media application to implement in order to process the media session; and
- a universal resource locator (URL) sufficient to indicate an address where the media application is to transmit the SessionToken received from the tablet.

12. The method of claim 1 further comprising transmitting the UPnP action such that the UPnP action travels from the first client to the second client without receipt at either one of the media and RUI servers.

* * * * *